Oct. 16, 1923.
F. C. MORRIS
1,470,864
BRAKE BAND SILENCING PAD
Filed Aug. 9, 1921
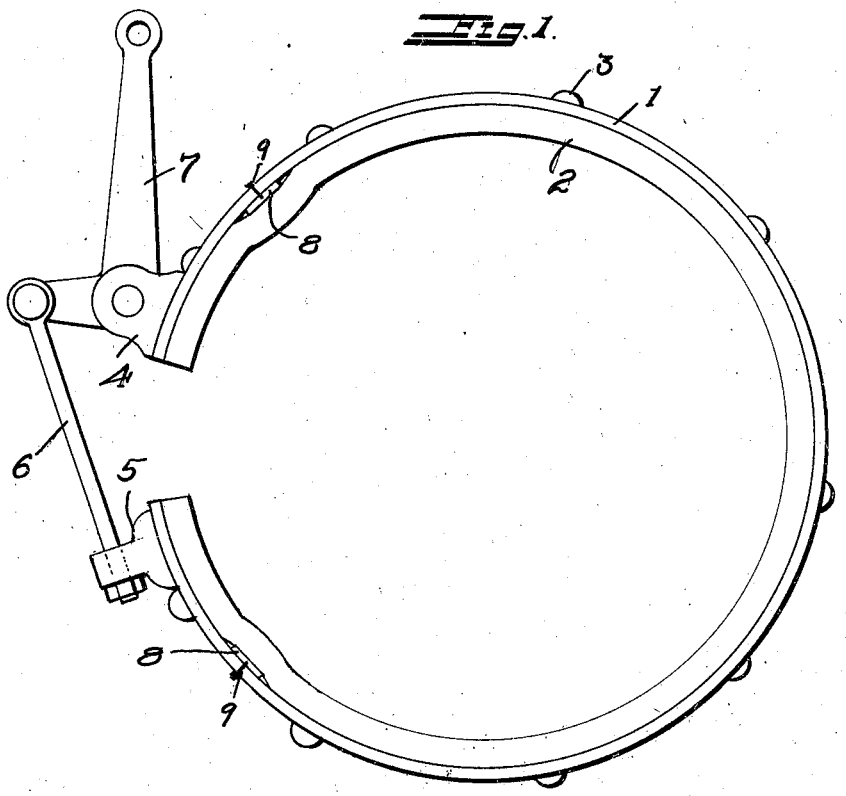
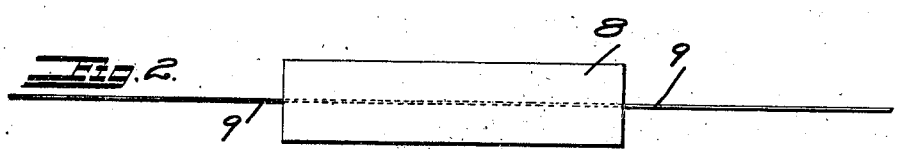
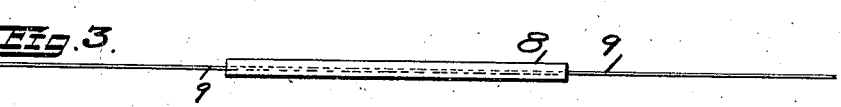
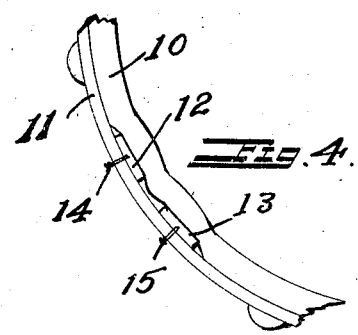
INVENTOR.
Fred C. Morris.
BY Carlos P. Griffin
ATTORNEY.

Patented Oct. 16, 1923.

1,470,864

UNITED STATES PATENT OFFICE.

FRED C. MORRIS, OF SAN FRANCISCO, CALIFORNIA, ASSIGNOR OF ONE-HALF TO ADAM A. RECTOR, OF SAN FRANCISCO, CALIFORNIA.

BRAKE-BAND SILENCING PAD.

Application filed August 9, 1921. Serial No. 490,900.

*To all whom it may concern:*

Be it known that I, FRED C. MORRIS, a citizen of the United States, residing at San Francisco, in the county of San Francisco, State of California, have invented a new and useful Brake-Band Silencing Pad, of which the following is a specification in such full and clear terms as will enable those skilled in the art to construct and use the same.

This invention relates to a brake band silencing pad and its object is to prevent brake bands from squeaking when the brakes are applied.

It will be understood by those skilled in the art that when the ordinary brake band upon a motor vehicle is tightened that it often causes an objectionable squeaking. This squeaking may be relieved by the application to the brake band of a suitable resilient backing applied between the brake band wearing surface and the flexible steel band to which the brake lining is applied.

A further object of the invention is to produce a silencing pad which may be easily applied to the brake bands and secured in place thereon.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of a brake band showing two of the pads applied thereto.

Fig. 2 is a plan view of one of the pads.

Fig. 3 is a side elevation of one of the pads, and

Fig. 4 is a side elevation of a portion of a large brake band having two of the pads applied thereto.

The numeral 1 indicates the brake band which has the lining 2 secured thereto by means of a plurality of rivets 3. Brackets 4 and 5 are connected to the ends of the brake band and the link 6 and bell crank 7 serve to tighten the brake band on the brake drum when necessary.

After the brake lining has been secured in place on the inside of the brake band 1, a sharp needle-like tool may be inserted between the brake band and the brake lining to produce sufficient space for the insertion of a pad of resilient material as shown at 8. This pad may be of any suitable resilient material capable of withstanding the necessary heat produced by the application of the brakes, and it is ordinarily made of a certain grade of rubber or rubber and asbestos.

This pad has a wire 9 extending longitudinally therethrough which is used for securing the pad in the proper position on the brake band. If the brake band is a very large one such as are used on the larger cars, it may be necessary to apply two of the pads as shown between the lining 10 and brake band 11, the pads being illustrated at 12 and 13, while their tightening wires are shown at 14 and 15.

What I claim is as follows, but various modifications may be made in the construction shown in the drawings and above particularly described form, within the purview of my invention.

I claim:

1. A brake band silencing pad, comprising a pad of resilient material and a metal strip to which said pad is secured and which metal strip is used for the purpose of securing the pad to the brake band.

2. A brake band silencing pad, comprising a pad of heat resistant resilient material, and a metal strip to which said material is secured and which is used to secure the pad to the inside of the brake band, between the metal and the brake lining.

In testimony whereof I, have hereunto set my hand this 3rd day of August A. D. 1921.

FRED C. MORRIS.